United States Patent [19]

Okada et al.

[11] Patent Number: 4,761,773
[45] Date of Patent: Aug. 2, 1988

[54] TRACKING CONTROL APPARATUS

[75] Inventors: Hiroo Okada, Ina; Yoshiaki Ikeda; Makie Morota, both of Tokyo, all of Japan

[73] Assignee: Olympus Optical Co., Ltd., Tokyo, Japan

[21] Appl. No.: 840,928

[22] Filed: Mar. 18, 1986

[30] Foreign Application Priority Data

Mar. 23, 1985 [JP] Japan .................................. 60-59151

[51] Int. Cl.⁴ ......................... G11B 7/00; G11B 21/10
[52] U.S. Cl. .......................................... 369/44; 369/46
[58] Field of Search ..................... 369/44, 45, 46, 111, 369/30, 32

[56] References Cited

FOREIGN PATENT DOCUMENTS 0090379 10/1983 European Pat. Off. .
3227300 3/1983 Fed. Rep. of Germany .

Primary Examiner—Donald McElheny, Jr.
Attorney, Agent, or Firm—Frishauf, Holtz, Goodman & Woodward

[57] ABSTRACT

An optical pickup is arranged under an optical disk. Tracks of the disk are irradiated with a laser beam from the pickup. A beam reflected by a given track becomes incident on the pickup. A tracking error signal from the pickup is supplied to a lens moving actuator through a gain phase compensating circuit and a lens driving circuit, and an objective lens in the pickup is radially moved along disk. The tracking error signal is supplied to a voice coil motor through the phase compensating circuit. A carriage carrying the pickup thereon can be radially moved along the disk. When a tracking instruction is generated, the lens driving circuit drives the objective lens to start tracking. Meanwhile, the low-frequency components of the tracking error signal which are lower than the resonance frequency of the lens tracking circuit are amplified by the gain phase compensating circuit. When the tracking error signal is converged within a predetermined threshold range, the amplification of the low-frequency components of the tracking error signal is stopped. At the same time, the operation of the voice coil motor is started. Tracking is performed by both the objective lens and the carriage to achieve two-step servo tracking.

3 Claims, 2 Drawing Sheets

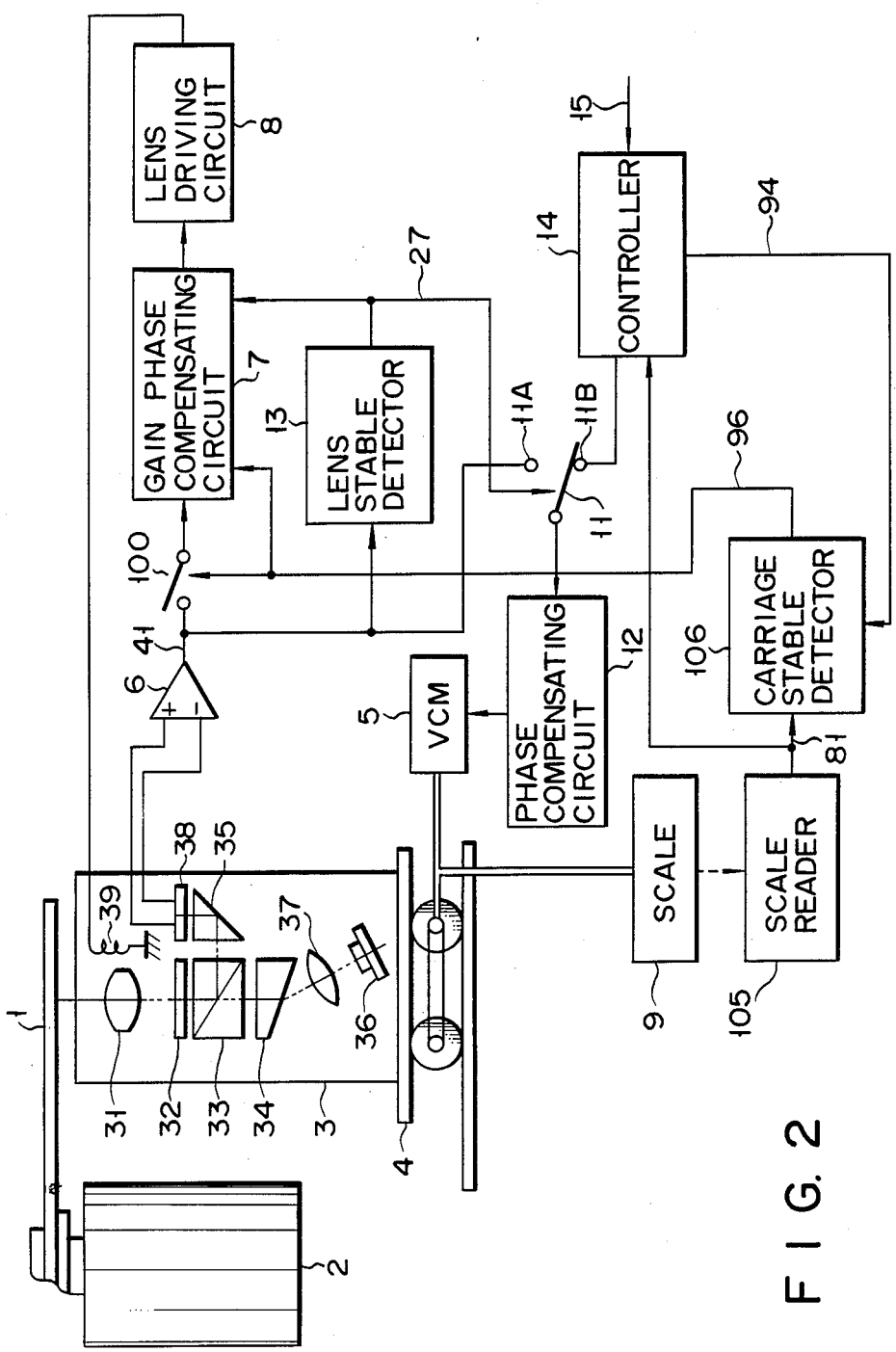
F I G. 2

TRACKING CONTROL APPARATUS

BACKGROUND OF THE INVENTION

The present invention relates to a data recording/reproducing apparatus using an optical disk or the like and, more particularly, to a tracking control apparatus therefor.

Data recording/reproducing apparatuses using optical disks have been commercially available in recent years. In order to read out data from an optical disk, a data recording track (to be referred to as a track hereinafter) is irradiated with a laser beam, and data is reproduced based on the beam reflected by the track. When the tracks are helically formed on the optical disk, since the sectors of a single track are not equidistant from the center of rotation of the disk, tracking control is necessary in the read mode to accurately irradiate the track with a laser beam. Even if the tracks are concentrically formed, sectors of a single track are not equidistant from the center of rotation of the disk due to eccentricity in the disk, thus making tracking control necessary.

A typical conventional example of a tracking circuit is a lens tracking circuit which moves an objective lens in response to a tracking error signal derived from light reflected by or transmitted through an optical disk. The objective lens is normally supported and fixed by a spring on an optical head housing. An actuator is energized to move the lens. When the actuator is deenergized, the lens is held at a mechanically neutral point balanced by a spring force. However, when track eccentricity exceeds twenty or thirty microns, the objective lens deviates greatly from the mechanically neutral point, thereby mixing an optical offset signal with the tracking error signal. The laser beam then traces an incorrect track in response to the optical offset signal.

In order to eliminate such an optical offset signal, a tracking system called a two-step servo system has been developed, as described in Japanese Patent Disclosure No. 60-143442. According to this system, the carriage and hence the optical pickup itself as well as the objective lens are moved to perform cooperative tracking. A tracking error signal representing a tracking error is supplied to the objective lens actuator and a carriage moving voice coil motor.

Gain $G_V$ of the carriage tracking circuit for the tracking error signal is larger than gain $G_L$ of the lens tracking circuit therefor. When carriage tracking is started with a large tracking error signal, the voice coil motor is excessively operated. Tracking with a laser beam becomes more difficult. For this reason, lens tracking comes first in the conventional two-step servo system. After the tracking error signal is reduced, carriage tracking is started.

The two-step servo tracking system, however, has the following drawback.

The frequency response of the carriage tracking circuit including the voice coil motor is shown by the broken line in FIG. 1. Its gain reaches a maximum in response to a low-frequency tracking error signal, i.e., low-frequency variations, and the gain is reduced when the frequency is increased. However, since the objective lens is supported and fixed by a leaf spring or the like, the lens is affected by the eigenfrequency of the leaf spring. The frequency response of the lens tracking circuit is shown by a solid line in FIG. 1.

Therefore, when objective lens tracking is started first as in conventional two-step servo tracking, the response at the low-frequency variations is poor. As a result, it is difficult to provide satisfactory tracking control.

SUMMARY OF THE INVENTION

It is an object of the present invention to provide a tracking control apparatus for eliminating the drawback of the conventional two-step servo tracking system and for precisely positioning a laser beam on a desired track at high speed.

In order to achieve the above object of the present invention, there is provided a tracking control apparatus, comprising a tracking control circuit for causing lens tracking circuit to start in response to a tracking instruction and then causing carriage tracking circuit to start, and a circuit for increasing a gain of the lens tracking circuit for frequency components lower than a resonance frequency of the lens tracking circuit while only the lens tracking circuit is operating.

BRIEF DESCRIPTION OF THE DRAWINGS

FIG. 2 is a block diagram of a tracking control apparatus according to an embodiment of the present invention.

DETAILED DESCRIPTION OF THE PREFERRED EMBODIMENT

Figure 1:
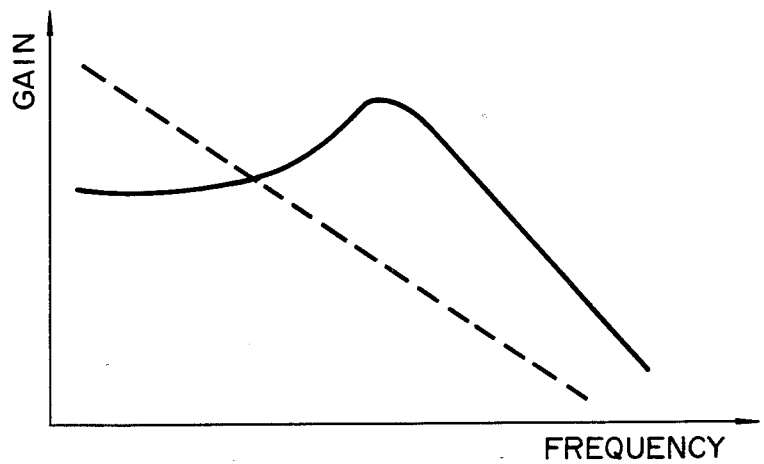
FIG. 1 is a graph showing frequency response characteristics of a lens tracking circuit and a carriage tracking circuit in a conventional two-step tracking circuit.

A tracking control apparatus according to an embodiment of the present invention will be described with reference to the accompanying drawings. FIG. 2 is a block diagram showing an embodiment exemplifying a read-only optical disk system. Optical disk 1 as a data recording medium is rotated by spindle motor 2 at a constant velocity. Disk 1 is placed such that its data recording surface faces downward. Optical pickup 3 is arranged under disk 1. Pickup 3 focuses a laser beam from semiconductor laser 36 to irradiate a track of disk 1 with a focused laser beam.

The laser beam from semiconductor laser 36 is incident on shaping prism 34 through collimator lens 37, and the cross-section of the laser beam is shaped circular. The laser beam from prism 34 is incident on λ/4 plate 32 and objective lens 31 through polarizing prism 33, and the track is irradiated with the laser beam from lens 31. The beam reflected by the track is incident on prism 33, and the optical path of the beam is bent through 90 degrees. The beam is then supplied to data reproduction section (not shown) through total-reflection prism 35 and to photodetector 38, whose detection region is split into halves, or quarters.

A difference output from photodetector 38 is supplied to differential amplifier 6, which then generates tracking error signal 41. Lens 31 is supported and fixed by a spring (not shown) and can be radially moved along disk 1 by actuator 39 as an objective lens moving means, so that the laser beam can be traced along a desired track. Pickup 3 is mounted on carriage 4, and carriage 4 is radially moved along disk 1 by voice coil motor (VCM) 5 as a carriage moving means, thus performing cooperative tracking.

Signal 41 is supplied from amplifier 6 to lens stable detector 13 and first input terminal 11A of selector 11 and to gain phase compensating circuit 7 through switch 100. An output from circuit 7 is supplied to lens driving circuit 8. Circuit 8 drives lens 31 through objective lens actuator 39.

Detector 13 determines in response to signal 41 if lens tracking is completed. When signal 41 converges within a predetermined threshold range, detector 13 generates lens stable signal 27. Signal 27 is supplied to the control terminal of selector 11 and circuit 7.

Second input terminal 11B of selector 11 receives a carriage control signal from controller 14. The carriage control signals include velocity and position control signals (to be described later). Selector 11 is normally connected to terminal 11B and is switched to terminal 11A upon generation of signal 27. An output from selector 11 is supplied to motor 5 through phase compensating circuit 12.

Scale 9 is mounted on carriage 4, and marks on scale 9 can be read to detect the displacement of carriage 4. Scale 9 may comprise an optical scale, a magnetic scale, a potentiometer, or the like. An output scale signal from scale reader 105 for reading the marks on scale 9 is supplied to controller 14 and carriage stable detector 106. Scale 9 and reader 105 can be constituted by the devices described in U.S. Pat. No. 4,481,613. Scale 9 has a periodic grating pattern. When carriage 4 is moved at a constant velocity, a sinusoidal scale signal of a constant period is generated. However, when the velocity of carriage 4 changes, the period of scale signal changes accordingly. When carriage 4 is stopped, the scale signal is disabled.

In the same manner as detector 13, detector 106 determines in response to scale signal 81 if tracking by the carriage is completed. When signal 81 converges within a predetermined threshold range, detector 106 generates carriage stable signal 96. Signal 96 is supplied to the control terminal of switch 100 and circuit 7. Switch 100 is normally open, but is closed upon generation of signal 96.

Figure 3:
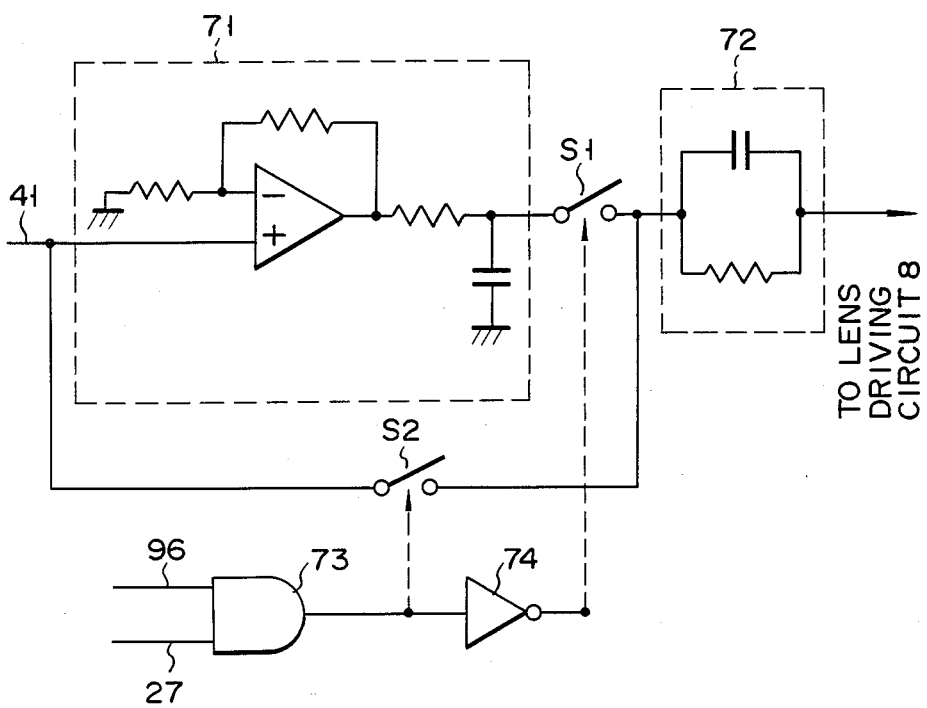
FIG. 3 is a circuit diagram showing the detailed arrangement of a gain phase compensating circuit of the apparatus in FIG. 2.

FIG. 3 is a circuit diagram showing a detailed arrangement of gain phase compensating circuit 7. Signal 41 is supplied to phase compensating circuit 72 through low-frequency gain integrator 71 and switch S1 and to circuit 72 through switch S2. Integrator 71 amplifies input signal components having a frequency less than a given frequency. The given frequency is defined as the resonance frequency of the lens tracking circuit. Signals 27 and 96 are supplied to AND gate 73. An output from gate 73 is supplied to the control terminal of switch S2. The output from AND gate 73 is also supplied to the control terminal of switch S1 through inverter 74.

The operation of the tracking control apparatus of this embodiment will be described. When the position of pickup 3 deviates greatly from a desired track, an access operation is performed to move pickup 3 near a target track. During the initial period of access, selector 11 is connected to terminal 11B, and switch 100 is open. When an access (i.e., moving of the carriage to the target track) instruction signal (one of signals 15 shown in FIG. 2) is supplied from a host controller to controller 14, controller 14 selects a prestored carriage velocity control curve in accordance with the difference between the current carriage position (track address) and the target track address. Controller 14 then supplies the selected carriage velocity control curve signal to motor 5 through terminal 11B of selector 11 and circuit 12.

Thus, the velocity of carriage 4 is controlled. This operation mode is called a velocity control mode.

When the carriage approaches the target track, the velocity control mode is replaced by a position control mode. Controller 14 stops generating the velocity control curve signal and begins to generate a position control signal to prevent carriage 4 from moving from the stop position by external vibrations. Since selector 11 remains at terminal 11B, the position control signal is supplied to motor 5 through selector 11 and circuit 12, and position control mode signal 94 is output to detector 106.

When access is completed, two-step servo tracking is started. In this embodiment, lens tracking by circuit 8 is started first. When the tracking error signal is detected as falling within the predetermined threshold range, carriage tracking by motor 5 is also started.

This operation will be described in more detail below. When access is nearly finished, the velocity of carriage 4 is reduced and the amplitude of signal 81 is gradually converged. When detector 106 detects that signal 81 has sufficiently converged and that the carriage has come to a complete stop, detector 106 determines the end of access. Detector 106 then generates signal 96 (high level). In response to signal 96 of high level, switch 100 is closed. In this state, a lens servo loop consisting of photodetector 38, amplifier 6, switch 100, circuits 7 and 8, and actuator 39 is formed to execute lens tracking.

In this state, signal 27 is not generated yet and remains at low level. The output from gate 73 remains low, and switches S2 and S1 are respectively open and closed. The low-frequency component of signal 41 is amplified by integrator 71, and amplified low-frequency signal 41 is supplied to circuit 72 through switch S1. With the frequency characteristics of the lens tracking circuit, the gain of components having a frequency lower than the resonance frequency is increased. Like the frequency response characteristics of the carriage tracking circuit, indicated by the broken line in FIG. 1, the gain is highest for low-frequency variations and linearly decreases for higher frequencies.

As this lens tracking servo is started, signal 41 is gradually converged. When detector 13 determines that signal 41 has sufficiently converged and that the laser beam has reached a desired track, detector 13 generates signal 27. At this time, selector 11 is switched to terminal 11A, and a carriage tracking servo loop consisting of photodetector 38, amplifier 6, selector 11, circuit 12, and motor 5 is formed in addition to the lens tracking servo loop to execute carriage tracking. The laser beam then traces the desired track. Since signal 96 is held high, when signal 27 goes high, the output from gate 73 also goes high to close switch S2 and open switch S1. Signal 41 is supplied to circuit 72 through switch S2 without passing through integrator 71. Therefore, the amplification of the low-frequency component of signal 41 is stopped. This is because low-frequency tracking by lens 3 continues when the low-frequency component of signal 41 is continuously amplified after start of carriage tracking, and because lens 3 deviates greatly from the mechanically neutral point, the optical offset signal is produced, and two-step servo tracking cannot be sufficiently performed. With two-step servo tracking, the displacement of carriage 5 is used mainly for low-frequency variations, and the displacement of lens 3 is used mainly for high-frequency variations.

According to this embodiment, in the two-step servo system, the low-frequency component of the tracking error signal is amplified only during lens tracking, i.e., during the initial period of the two-step servo tracking. The degradation of response to the low-frequency component during the initial period of tracking in the conventional two-step servo system can be prevented, thereby providing satisfactory tracking control.

The present invention is not limited to the particular embodiment described above. Various changes and modifications may be made within the spirit and scope of the invention. Instead of moving the objective lens, a laser or a mirror in the optical path may be used to move the laser beam. The carriage moving means may be constituted by a ball screw or an α belt in place of the VCM. Switch 100 (FIG. 2) for controlling formation of the lens servo tracking loop may be connected to the output of circuit 7. Selector 11 for controlling formation of the carriage servo tracking loop may be connected to the output of circuit 12. In the above embodiment, a read-only system is exemplified. However, the present invention can also be applied to a recording/reproducing apparatus. Furthermore, the recording medium is not limited to optical disks but can comprise tapes, cards or drums.

What is claimed is:

1. A tracking control apparatus for tracking a desired track with a laser beam emitted from a laser device through an objective lens and for generating a tracking error signal representing a difference between a portion tracked by the laser beam and the desired track, said tracking control apparatus comprising:

lens tracking means coupled to an objective lens for tracking a desired track with a laser beam and including means for moving the objective lens in accordance with a tracking error signal, said tracking error signal having a plurality of frequency components;

carriage tracking means coupled to a laser device for tracking the desired track with the laser beam and including means for moving the laser device in accordance with the tracking error signal;

tracking control means coupled to said lens tracking means and to said carriage tracking means for operating only said lens tracking means during a first time period and for operating both said lens tracking means and said carriage tracking means during a second time period after said first time period; and gain compensating means, coupled to said lens tracking means, and including amplifying means for amplifying only predetermined frequency components of said tracking error signal supplied to said lens tracking means only during said first time period, said amplified frequency components being lower than a resonance frequency of said lens tracking means, said gain compensating means thereby increasing a gain of said lens tracking means for said amplified frequency components lower than said resonance frequency of said lens tracking means only during said first time period.

2. The tracking control apparatus of claim 1, wherein:

said moving means of said lens tracking means comprises actuator means for moving said objective lens in response to said tracking error signal;

said carriage tracking means includes a carriage;

said moving means of said carriage tracking means includes voice coil motor means for moving said carriage in response to said tracking error signal; and further comprising means for causing first said lens tracking means to move said lens in response to a tacking instruction, and detecting means for then causing said carriage tracking means to move said carriage upon detecting that said tracking error signal has converged within a predetermined threshold range.

3. The tracking control apparatus of claim 1, wherein:

said moving means of said lens tracking means comprises a leaf spring for supporting said objective lens; and actuator means for moving said objective lens, in response to said tracking error signal, in a direction substantially perpendicular to the tracks; and said carriage tracking means comprises a carriage on which is mounted said lens tracking means and said laser device; and said moving means of said carriage tracking means includes a voice coil motor means for moving said carriage, in response to said tracking error signal, in said direction substantially perpendicular to the tracks.

* * * * *

UNITED STATES PATENT AND TRADEMARK OFFICE
CERTIFICATE OF CORRECTION

PATENT NO. : 4,761,773
DATED : Aug. 2, 1988
INVENTOR(S) : OKADA et al

It is certified that error appears in the above-identified patent and that said Letters Patent is hereby corrected as shown below:

Title page, left-hand column, under "Foreign Patent Documents"

insert -- 58-105435   6/83   JAPAN --

Title page, under "References Cited" insert --

U.S. Patent Documents

| | | |
|---|---|---|
| 4,580,255 | 4/86 | INOUE et al |
| 4,615,023 | 9/86 | INADA et al |
| 4,453,239 | 6/84 | MUSHA et al |
| 4,651,314 | 3/87 | YOSHIKAWA et al |
| 4,562,565 | 12/85 | TAMURA |
| 4,587,644 | 5/86 | FUJIIE |
| 4,656,617 | 4/87 | NAKATSUYAMA et al |
| 4,627,040 | 12/86 | ARAI et al -- |

Signed and Sealed this

Thirtieth Day of May, 1989

*Attest:*

DONALD J. QUIGG

*Attesting Officer*    *Commissioner of Patents and Trademarks*